April 15, 1969  J. MARTIN  3,438,763
COMB-LIKE CATCH PANS FOR VERTICAL DRAW SHEET
GLASS MAKING MACHINES
Filed Oct. 19, 1965

INVENTOR
JOHN MARTIN

BY *Lemon, Palmer, Stewart & Estabrook*

ATTORNEYS

United States Patent Office 3,438,763
Patented Apr. 15, 1969

3,438,763
COMB-LIKE CATCH PANS FOR VERTICAL DRAW SHEET GLASS MAKING MACHINES
John Martin, Anahuac, Monterrey, Nuevo Leon, Mexico, assignor to Fabricacion de Maquinas, Monterrey, Mexico, a corporation of Mexico
Filed Oct. 19, 1965, Ser. No. 497,659
Int. Cl. C03b 15/02
U.S. Cl. 65—165                                  3 Claims

ABSTRACT OF THE DISCLOSURE

Catch pans for a vertical draw sheet glass forming and annealing machine are disclosed which are positioned at the lower end of the machine between the molten glass bath and the first pair of drawing rolls. Each catch pan is slit at a plurality of points pependicular to the plane of the glass sheet and is covered on one side with a replaceable sheet metal cover.

---

This invention relates to glass making machines and more particularly to sheet glass making and annealing machines of the so called vertical draw type.

As is known to those skilled in this art, it is common to provide trays or shelf members at the bottom of machines of this type positioned between the lowermost point of the machine and the surface of the molten glass from which the sheet is formed and drawn. Such trays extend inwardly toward each other from the sides of the machine and terminate quite closely adjacent the upwardly traveling glass web. The spacing at this point is only large enough to permit passage of the "bait." At this particular point in the upward travel of the glass web from the molten bath, it is of course very hot and it is also extremely sensitive to heat loss particularly if such losses are unequally distributed along the width of the sheet. The net result of an unequal heat loss at this point is to produce glass which is of inferior quality. The purpose of the trays at the base of the machine is to provide a means for catching pieces of broken glass which may fall down from the upper portions of the machine and would otherwise enter the molten bath of glass. Conventionally, such trays are formed of substantial structural material such as steel and in the past they have been solid steel. The difficulty with trays of this type is that because of their length in a direction parallel to the upwardly traveling sheet of glass, and the temperatures to which they are exposed, there is a tendency for them to warp. Since each tray constitutes a body to which heat from the upwardly moving sheet of glass is lost by radiation, any unevenness in spacing of the edge of the trays from the upwardly moving glass sheet such as would be caused by warpage of the tray results in unequal heat losses along the width of the sheet and therefore in an inferior glass product.

Accordingly it is the principal object of the present invention to provide a lower tray structure for vertical draw sheet glass making machines which while retaining the structural strength necessary to withstand the shock of falling glass particles, will nevertheless be completely free of warpage and thus present a uniform heat absorbing body throughout the width of the glass sheet.

Figure 1:
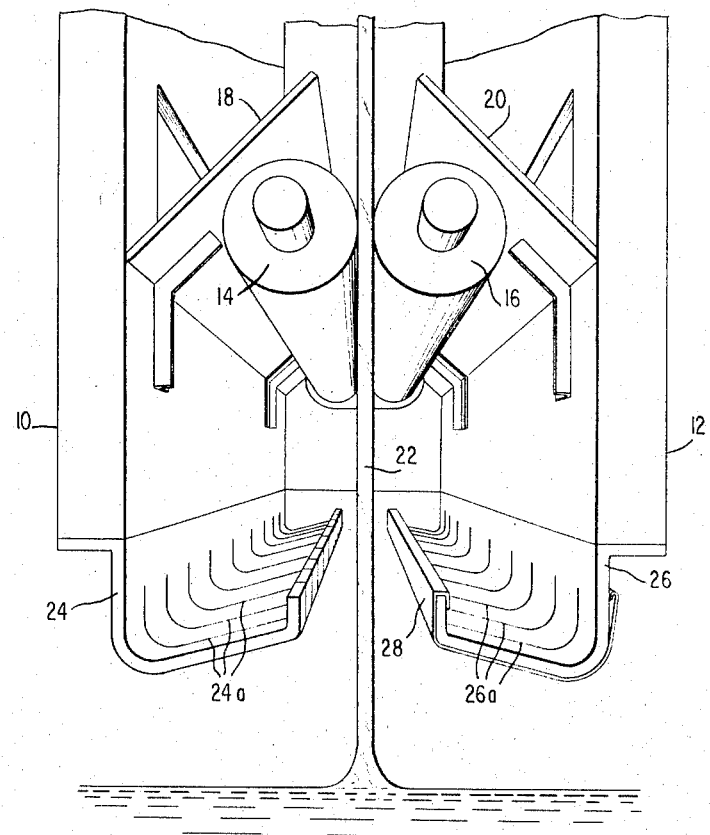
Figure 2:
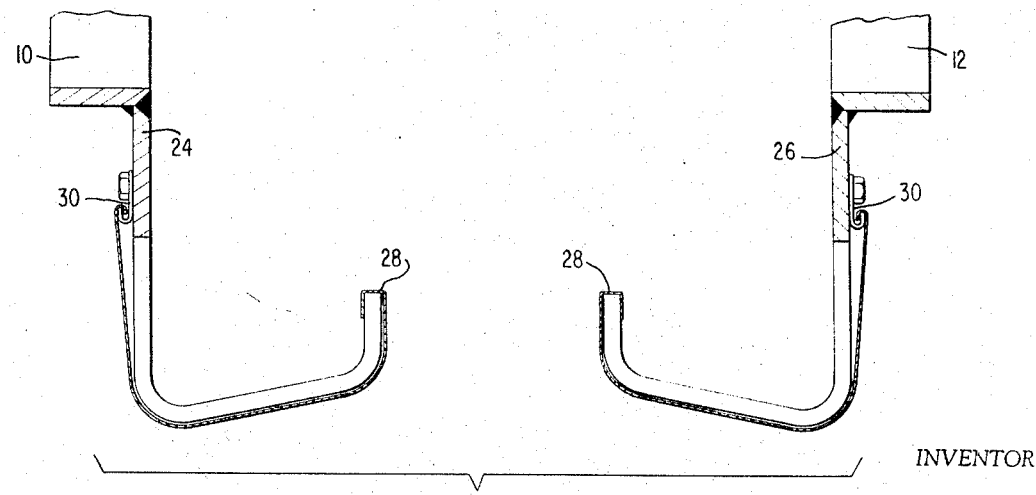

Other objects of the present invention will be apparent to those skilled in the art from a detailed description of the preferred embodiment illustrated in the attached sheet of drawings in which FIGURE 1 is a perspective end view of the present invention and FIGURE 2 is an enlarged detail of the lower portions of FIGURE 1.

In general, the objects of the present invention are achieved by taking a conventional tray structure of solid steel and effecting a plurality of cuts completely through each tray from that point adjacent to the glass sheet outwardly away from the glass sheet to a point adjacent the side wall of the machine. This provides a comb-like structure the outermost ends of the tines of the comb being disposed closest to the glass sheet. The outermost ends of the tines are bent vertically upwardly so as to define a substantially flat plane surface parallel to the traveling sheet of glass. The exposed tines are then preferably covered by a sheet metal jacket which due to the rigidity of the tines themselves will be retained in its initial shape regardless of temperature in the area.

Referring now to the single sheet of drawings for a detailed description of the present invention, FIGURE 1 illustrates in a perspective view the lowermost portion of a glass-making machine of the vertical draw type which includes side walls 10 and 12. The first pair of drawing rolls are also shown in this figure at 14 and 16 and these rolls underlie conventional baffle deflector members 18 and 20. The upwardly moving glass sheet is indicated by the reference numeral 22.

Attached to the lowermost ends of the side walls 10 and 12 are the tray members 24 and 26 which form the subject matter of the present invention. These may be attached to the side walls 10 and 12 in any convenient manner so long as the attachment is rigid. Each of the tray members 24 and 26 is cut into a plurality of comb like tines by cuts indicated at 24a and 26a and it will be noted that these cuts extend from the innermost edge of the tray to a point substantially coincident with the side wall of the machine.

In order to have an obsolutely smooth heat absorbing surface adjacent the moving glass sheet 22, a metal jacket indicated at 28 is placed over each of the trays. In this figure, only one of the two jackets is shown, in FIGURE 1 in order that the comb-like structure of the trays may be clearly illustrated.

The jacket may be easily replaced at very small expense as compared with the expense of replacing the entire tray which is a solid steel member of substantial thickness and structural strength. As shown most clearly in FIGURE 2, bracket members 30 are bolted to the outer surface of the tray members 24 and 26. The sheet metal covering in the trays therefore is merely hung on these brackets and the tips of the tines. Whenever it becomes necessary to replace these members therefore they may be easily slid horizontally into their respective tray and a new jacket inserted in the same manner.

From the foregoing, it will be apparent to those skilled in this art that there is herein shown and disclosed a new and useful glass particle tray catcher for sheet glass forming machines of the vertical draw type. While a preferred embodiment has been illustrated in the accompanying drawings and described in the specification, applicant claims the benefit of a full range of equivalents within the scope of the appended claims.

I claim:
1. In a vertical draw sheet glass forming machine in which glass from a molten bath is drawn upwards by a series of pairs of vertically aligned rolls, a structure positioned at and supported on the lowermost end of the machine between the molten bath and the first set of rolls comprising:
 a pair of tray like members affixed to the lowermost portion of the machine, extending inwardly toward each other and terminating closely adjacent to opposite sides of the upwardly moving glass sheet, each said member being a comb-like structure with the tips of the tines bent upwardly to define a substantially vertical surface parallel to the glass sheet· and a sheet metal cover for each of said tray members said cover overlying at least said vertical plane surface of said tray members facing the glass sheet.

2. The combination defined by claim 1 in which said sheet metal cover extends over said tray members from a point on the outer surface thereof, along the underside of the tines and then upward over the vertical surface and over the tips of the tines.

3. The combination defined by claim 2 in which said sheet metal cover is readily removable from and replaceable on said tray by horizontal sliding in a direction parallel to the vertical surface of said tines.

References Cited

UNITED STATES PATENTS 3,226,216  12/1965  Oxley et al. _____ 65—194 X

DONALL H. SYLVESTER, *Primary Examiner.*

R. V. FISHER, *Assistant Examiner.*

U.S. Cl. X.R.

65—27, 168, 194